United States Patent [19]

Fukamizu et al.

[11] Patent Number: 4,690,553

[45] Date of Patent: Sep. 1, 1987

[54] ROAD SURFACE CONDITION DETECTION SYSTEM

[75] Inventors: Hiroshi Fukamizu, Takatsuki; Masaji Nakano, Otokuni; Kunio Iba, Kobe; Taro Yamasaki, Shikama; Kenji Sano, Kakogawa, all of Japan

[73] Assignee: Omron Tateisi Electronics Co., Kyoto, Japan

[21] Appl. No.: 158,901

[22] Filed: Jun. 12, 1980

[30] Foreign Application Priority Data

Jun. 29, 1979 [JP] Japan ............... 54-83112

[51] Int. Cl.⁴ ............... G01N 21/47; G01N 21/55; G08B 19/02
[52] U.S. Cl. ............... 356/51; 340/583; 356/448
[58] Field of Search ............... 356/51, 448, 445–446; 250/338–339, 341; 340/581, 583, 22

[56] References Cited

U.S. PATENT DOCUMENTS 2,816,233 12/1957 Krueger ............... 250/339
3,471,698 10/1969 Mausteller et al. ............... 250/339
4,171,918 10/1979 MacTaggart ............... 356/408

OTHER PUBLICATIONS

De La Perrelle et al. "The Measurements of Absorptivity & Reflectivity", Infrared Physics, 1963, pp. 35-43.

Primary Examiner—William H. Pinter
Attorney, Agent, or Firm—Wegner & Bretschneider

[57] ABSTRACT

Road surface condition detection system comprising light projector means for projecting light including the infrared region of the spectrum to a road surface to sense the condition thereof, the infrared having wavelengths at which the reflectance of snow is smaller than that of the road surface in a dry condition, light receiving means for receiving light reflected from the road surface, comparisons means for comparing the output signals generated from the light receiving means with reference signal levels corresponding to dry, wet, snowy and frozen conditions, and judging means for judging the road surface to be one of the conditions in accordance with results of comparison.

11 Claims, 6 Drawing Figures

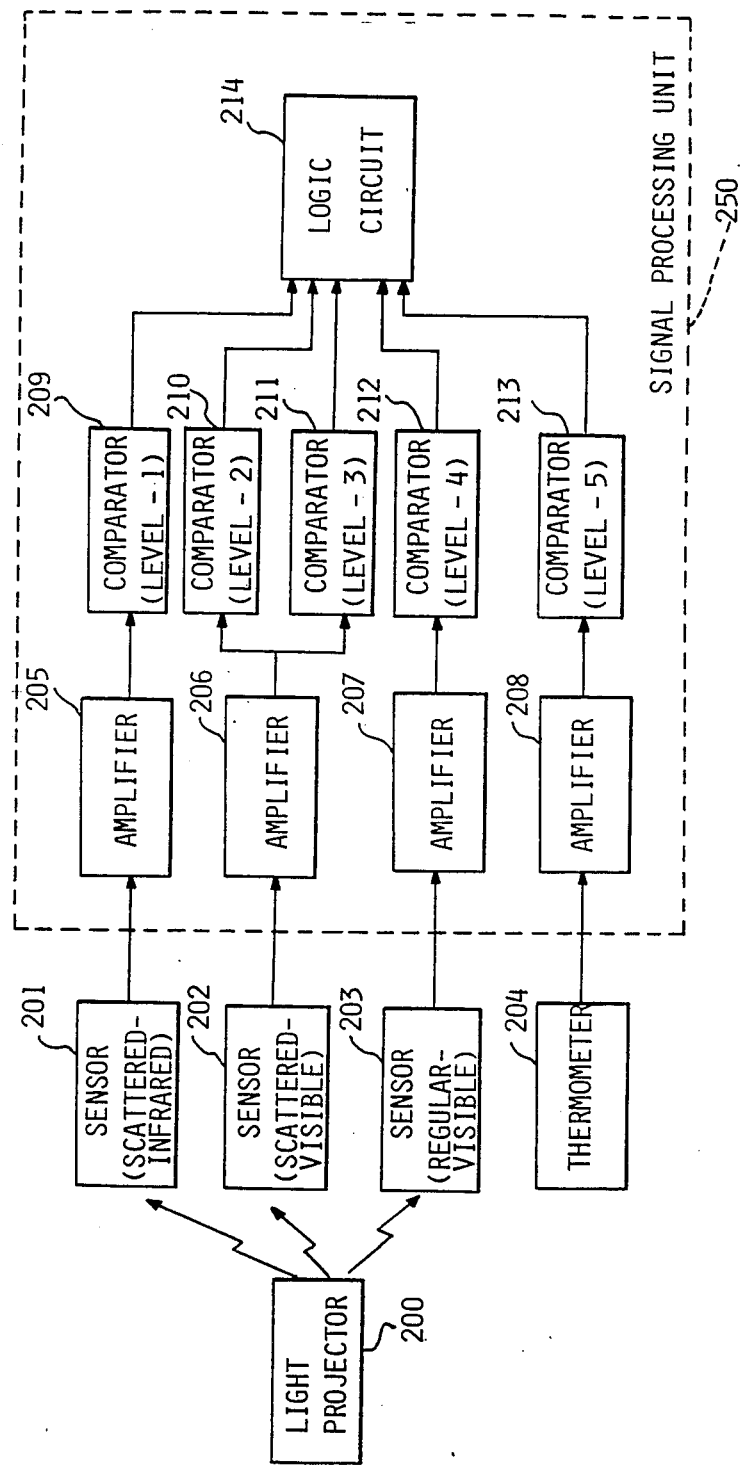
F I G. 5

ROAD SURFACE CONDITION DETECTION SYSTEM

BRIEF SUMMARY OF THE INVENTION

The present invention relates to a road surface condition detection system for detecting the condition of a road surface which is applicable to a traffic control system, and more particularly to an improved system for sensing a road surface condition such as dryness, wetness, snow or freeze.

It is very important in a traffic control system to ensure security of car drivers on roads from accidents due to a frozen or snowy road surface, and for this purpose it is required to detect the surface condition of the road fast and precisely In order to detect a road surface condition, there have been developed a variety of detection systems.

A conventional detection system is such that a detector is installed under a road surface to detect water and temperatures so that the system judges the road surface condition on the basis of the output signals generated from the detector. Such a conventional detection system, however, is disadvantageous in that the installation of the detector involves a fairly large construction work and also that the detector, once buried, is liable to be damaged by traffics and therefore requires maintenance work which requires much labor and time. Another disadvantage is that the detection field is restricted to just around the detector and a desired detection of the road surface cannot always be precisely performed.

Another conventional detection system is such that a light projector projects visible rays to a road surface to be detected so that the system judges the surface condition of the road on the basis of the reflected rays from the surface. Such detection system also has the disadvantage that the system cannot discriminate a dry road surface from a road surface fouled with snow, mud and water (hereinafter referred to as "snow-jam") or a surface clad with snow topped by dust (hereinafter referred to as "black-snow") because the reflectance of such snow-jam or black-snow is similar to that of the dry road surface. If the road surface to be detected by the system is clad with dust or sand so as to become white, there may be cases in which the system misjudges the road surface as a snowy road surface. Thus, it is difficult to expect a precise detection of road surface condition with the above-mentioned conventional detection systems.

According to the present invention, there is provided a road surface condition detection system comprising: light projecting means for projecting light including the infrared region of the spectrum to a road surface to sense the condition thereof; said infrared radiation having a wavelength at which the reflectance of snow is smaller than that of said road surface in a dry condition, light receiving means for receiving light reflected from said road surface and for generating output signals representing the luminous energy of said reflected light; comparison means for comparing said output signals with predetermined reference signal levels corresponding to classified road surface conditions so as to generate comparison output signals representing results of comparison; and judging means for judging said road surface to be one of said classified road surface conditions in accordance with said comparison output signals.

It is, therefore, a primary object of the present invention to provide a road surface condition detection system which is easy to be installed into a desired place with simplified construction and is easily maintained.

It is a further object of the present invention to provide a road surface condition detection system which employs infrared radiation for a precise and fast detection of a road surface condition.

It is a still further object of the present invention to provide a road surface condition detection system which may precisely discriminate among road surface conditions such as snow, freeze, dryness, and wetness.

Other objects and advantages of the present invention will be apparent upon reference to the following description in conjunction with accompanying drawings, in which:

BRIEF DESCRIPTION OF DRAWINGS

FIG. 5 is a schematic block diagram of a road surface condition detection system which is still another embodiment of the present invention.

DETAILED DESCRIPTION

Figure 1:
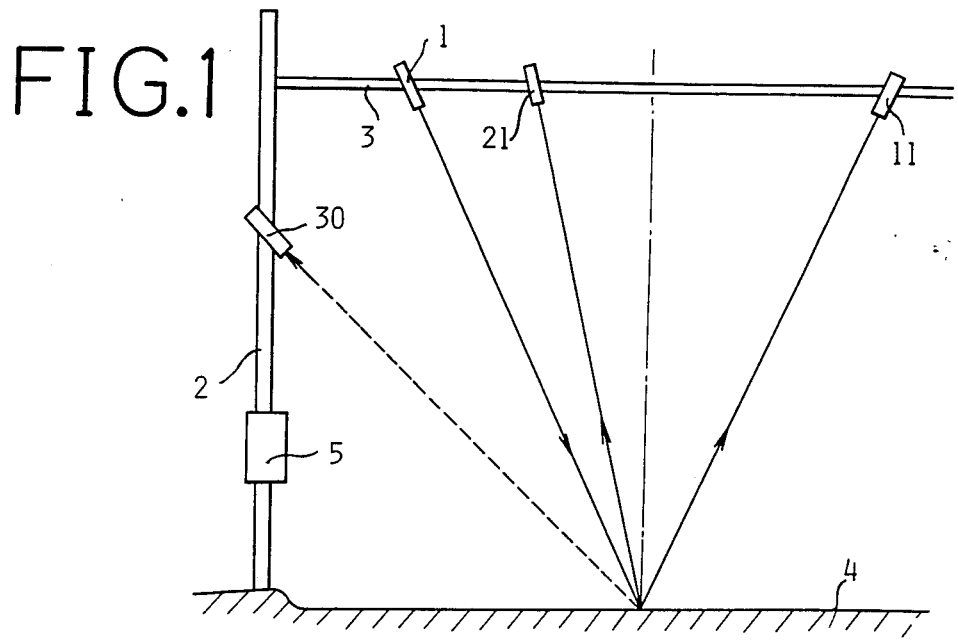
FIG. 1 is a schematic illustration showing a road surface condition detection system as a preferred embodiment of the present invention.

Referring, now, to FIG. 1, there is shown a road surface condition detection system as a preferred embodiment of the present invention. The road surface condition detection system comprises a light projector 1 for projecting infrared radiation to a road surface 4 to be detected by the system, a regular light sensor 11 for receiving regular reflection infrared radiation from the road surface 4, a scattered light sensor 21, a radiation-type thermometer 30 for sensing the temperature of the surface 4 in response to a radiant ray coming therefrom, and a signal processing unit 5 coupled to said sensors 11 and 21 and thermometer 5. The signal processing unit 5 is further coupled to a traffic control system (not shown in drawings) for a safety traffic control service.

A support arm 3 is fixed to a pole 2 standing at the edge of the road surface 4. The light projector 1 is fixed to the arm 3 so as to project light to a detection area of the road surface 4 at a constant incident angle. The incident angle need not necessarily be a specific angle, for it does not influence the detection characteristic of the present system. The light projector 1 includes a lamp which projects infrared radiation in the infrared region of the spectrum from 1.4 to 2.5 micrometers. The lamp may be a halogen-vapor lamp having a broad emission spectrum covering both the visible and infrared regions with a peak emission occurring at about 1 micrometer or a mercury-vapor lamp having an emission spectrum in the range of 1.2 to 2.5 micrometers. In front of the lamp there is mounted within the light projector 1 an infrared filter which passes infrared radiation at wavelengths longer than 1.4 micrometers therethrough. The light having such infrared radiation projected from the lamp is properly focused by an optical lens and thereby caused to impinge on the road surface 4. The area of. surface 4 on which the light so impinges should be adequately large in order to compensate for the change of elevation of the road surface due to fallen snow.

The regular light sensor 11 is fixed to the arm 3 so as to receive regular reflection light from the surface 4 at a reflection angle having the same angle as the incident angle. The scattered light sensor 21 is fixed to the arm 3 at a position different from the sensor 11 so as to receive scattered reflection light from the surface 4. The respective sensors 11 and 21 have photoelectric conversion elements and infrared filters in . front of the conversion elements. The filters pass the infrared radiation at wavelengths longer than 1.4 micrometers therethrough, so that external noise from solar light or night illuminations on the streets may be reduced. The photoelectric convertion elements may be made of lead sulfide (PbS) or lead selenide (PbSe). Thus, the sensors 11 and 21 generate output signals representing the luminous energies of regular and scattered reflections, respectively.

Figure 2:
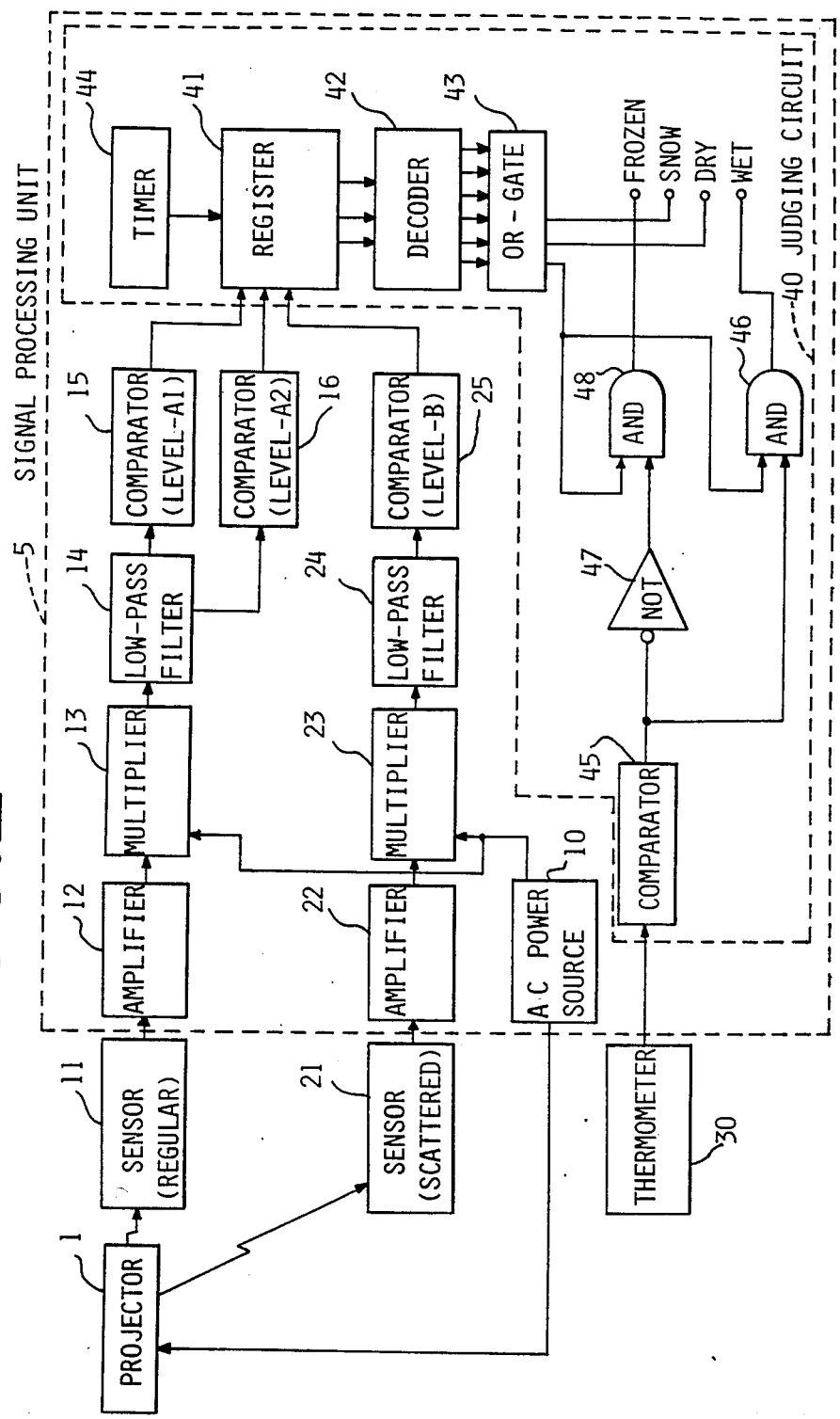
FIG. 2 is a schematic block diagram of the detection system of FIG. 1.

Referring to FIG. 2, the signal processing unit 5 includes amplifiers 12 and 22, multipliers 13 and 23, low-pass filters 14 and 24, comparators 15, 16 and 25, and a judging circuit 40. An AC power source 10 is connected to the light projector 1. Sine wave signals of 60 Hz generated from the source 10 are applied to the multipliers 13 and 23. The projector 1 is energized by the sine wave signal from the source 10. The output signals from the sensors 11 and 21 are amplified by the amplifiers 12 and 22, and the amplified signals are applied to the multipliers 13 and 23, respectively. The multipliers 13 and 23 extract the amplified signals synchronized with the sine wave signal from the source 10 and converts the extracted signals into DC signals. Thus, the signals from the sensors 11 and 21 modulated by the sine wave from the source 10 are demodulated to such DC signals. The output signals from the:multipliers 13 and 23, respectively, comprise the DC signal, the AC signal of 120 Hz and noise. The output signals are respectively applied to the low-pass filters 14 and 24 which reject the 120 Hz AC signals and noises but pass the DC signals. The output signals from the filters 14 and 24 include information regarding the condition of surface 4, and are applied to the comparators 15, 16 and 25.

Figure 3:
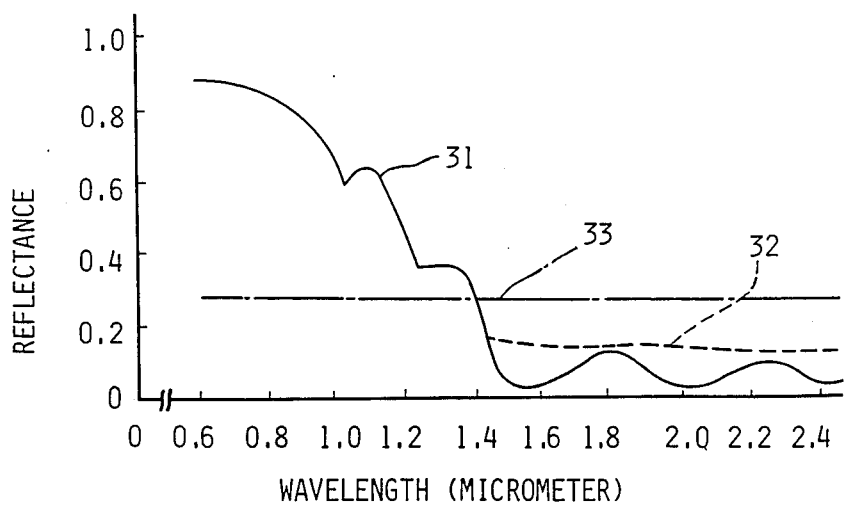
FIG. 3 is a graph showing the theoretical spectral reflectances of snow, freeze and dryness of road surface for illustration of the present invention.

In FIG. 3, there are shown the theoretical spectral reflectance curves 31, 32 and 33 of white snowy, frozen and dry road surfaces, respectively. The respective reflectances of FIG. 3 mean the reflectances relative to barium sulfate. As shown in FIG. 3, the road surface clad with white snow is represented by the reflectance curve 31 which is high at visible wavelengths, gradually declines near the infrared region, and sharply declines around the 1.4 micrometer wavelength. The overall shape of the reflectance curve 31 is slightly displaced downwardon aging of snow. The curve 33 also varies per change of conditions The experimental signal level data on the output signals from the filters 14 and 24 are shown in TABLE 1 below with respect to a dry concrete (or asphalt) pavement surface (DRY), a wet concrete (or asphalt) pavement surface (WET) and a snow clad concrete (or asphalt) pavement surface (SNOW). The SNOW is further classified into the three conditions of WHITE SNOW, SNOW-JAM and BLACK-SNOW. The respective data in TABLE 1 are typical values in the wavelength range of 1.4 to 2.5 micrometers.

TABLE 1

| CONDITION | OUTPUT REGULAR REFLECTION (FILTER 14) | SCATTERED REFLECTION (FILTER 24) |
|---|---|---|
| DRY | 200 | 340 |
| WET | 800 | 140 |
| SNOW | | |
| WHITE SNOW | 100 | 200 |
| SNOW-JAM | 80 | 100 |
| BLACK-SNOW | 100 | 160 |
| | | mV |

It will be understood from TABLE 1 that the reflectance of snow is reduced even if the surface condition is white snow, snow-jam or black-snow, because infrared radiation is absorbed by such snow. In the wet condition, the infrared radiation is absorbed by water, but the wet road has the mirror surface, so that the regular reflectance is increased whereas the scattered reflectance is reduced. In the dry condition in which the road surface has a diffuse surface, the regular reflectance is intermediate between the reflectances of wet and snow conditions, whereas the scattered reflectance is above those of wet and snow conditions.

The comparator 15 internally has a reference signal level, LEVEL A1 (e.g. 150 mV) which is predetermined to lie between the levels of filter (14) output signals corresponding to dry and snow conditions. The comparator 16 has a reference signal level, LEVEL A2 (e.g. 500 mV), which is predetermined to lie between the levels of output signals from filter 14 corresponding to wet and dry conditions. The comparator 25 also internally has a reference signal level, LEVEL B (e.g. 250 mV), which is predetermined to lie between the levels of output signals from filter 24 corresponding to the dry condition and the wet or snow condition. In view of TABLE 1, the respective comparators 15, 16 and 25 are designed to generate logic signals "1" or "0" in response to the levels of output signals from filters 14 and 24 as shown in the following TABLE 2:

TABLE 2

| | REGULAR REFLECTION (Output Signal from Filter 14) | | SCATTERED REFLECTION (Output Signal from Filter 24) | |
|---|---|---|---|---|
| CONDITION | OUTPUT OF COMPARATOR 15 | OUTPUT OF COMPARATOR 16 | CONDITION | OUTPUT OF COMPARATOR 25 |
| WET | 1 (>A1) | 0 (≧A2) | DRY | 1 (>B) |
| \/ | LEVEL A2 | | \/ | LEVEL B |
| DRY | 1 (>A1) | 1 (<A2) | WET or SNOW | 0 (≦B) |
| \/ | LEVEL A1 | | | |
| SNOW | 0 | 1 | | |

TABLE 2-continued

| | REGULAR REFLECTION (Output Signal from Filter 14) | | SCATTERED REFLECTION (Output Signal from Filter 24) | |
|---|---|---|---|---|
| CONDITION | OUTPUT OF COMPARATOR 15 | OUTPUT OF COMPARATOR 16 | CONDITION | OUTPUT OF COMPARATOR 25 |
| | ($\leq$A1) | (<A2) | | |

A1 = 150 mV
A2 = 500 mV
B = 250 mV

In TABLE 2, the respective logic data (1,0), (1,1) and (0,1) of the combination data (output of the comparator 15, output of the comparator 16) indicate wet, dry and snow conditions, respectively. The logic signal "1" from the comparator 25 indicates dry condition and the logic signal "0" therefrom indicates wet or snow condition. The logic signals, shown in TABLE 2, generated from the comparators 15, 16 and 25 are applied to the judging circuit 40. The radiation-type thermometer 30 is fixed to the pole 2 so as to sense the temperature of the detection area of surface 4 irradiated by the projector 1, and a sensed temperature signal as generated from the thermometer 30 is also applied to the judging circuit 40.

The judging circuit 40 includes a logic circuit which performs a final judgement of the surface condition of the road surface 4 based on the judgement on the basis of the logic signals or comparison output signals from comparators 15 and 16 for the regular reflection light, the judgement on the basis of the logic signals from comparator 25 for the scatteringly reflected light, and the signal from the thermometer 31 for the sensed temperature. In the same logic circuit, this final judgement is classified into the four conditions of dryness, wetness, freeze and snow. In other words, the logic circuit of the circuit 40 includes a predetermined pattern of logic signals as shown in the following TABLE 3, and performs the final judgement in accordance therewith.

TABLE 3

| FINAL JUDGE | JUDGE BASED ON REGULAR REFLECTION | JUDGE BASED ON SCATTERED REFLECTION | JUDGE BASED ON TEMPERATURE |
|---|---|---|---|
| DRY | DRY | DRY | NONE |
| WET | WET | WET or SNOW | WET (> −3° C.) |
| FROZEN | WET | WET or SNOW | FROZEN($\leq$ −3° C.) |
| SNOW | DRY | WET or SNOW | NONE |
| | SNOW | DRY | |
| | SNOW | WET or SNOW | |

The combination of TABLE 3 may be modified by changing the reference levels A1, A2 and B as desired.

The judging circuit 40 includes a register 41 connected to the comparators 15, 16 and 25, a timer 44, decoder 42, OR-gate 43, AND-gates 46 and 48, and NOT-gate 47. In the timer 45 there is preset a predetermined minimum detection time period which is longer than the time period during which a passing car is present within the detection area of road surface 4 of the system. Namely, the reflected light from projector 1 is blocked by the passing car which is present on the road surface . 4, but the time period during which the reflected light is blocked by the passing car is generally shorter than the time period during which the reflected light is received by sensors without being blocked. Then, the minimum detection time period is preset in the timer 44, and if any of the output signals from the comparators 15, 16 and 25 remain unchanged during the preset minimum detection time period, the output signals from the comparators are temporailly stored in the register 41 for subsequent application to the decoder 42. The decoder 42, OR-gate 43, AND-gates 46 and 48, and gate 47 process the output signals from the register 41 in accordance with the logic table shown in TABLE 3, and generate judgement signals indicating that the condition of surface 4 is frozen,wet, snow or dry.

In the present embodiment, the road surface detection system utilizes the infrared radiation in the wavelength range over 1.4 micrometers in which the reflectance of snow is lower than that of dry road surface, and may precisely detect any kind of snow, such as white snow, snow-jam, black snow or the like. The road surface detection system may be modified to omit the thermometer 30 if desired. It will be understood that the modified detection system without the thermometer may detect dryness, wetness and snow, although whether the road surface condition is wet or frozen cannot be detected.

Figure 4:
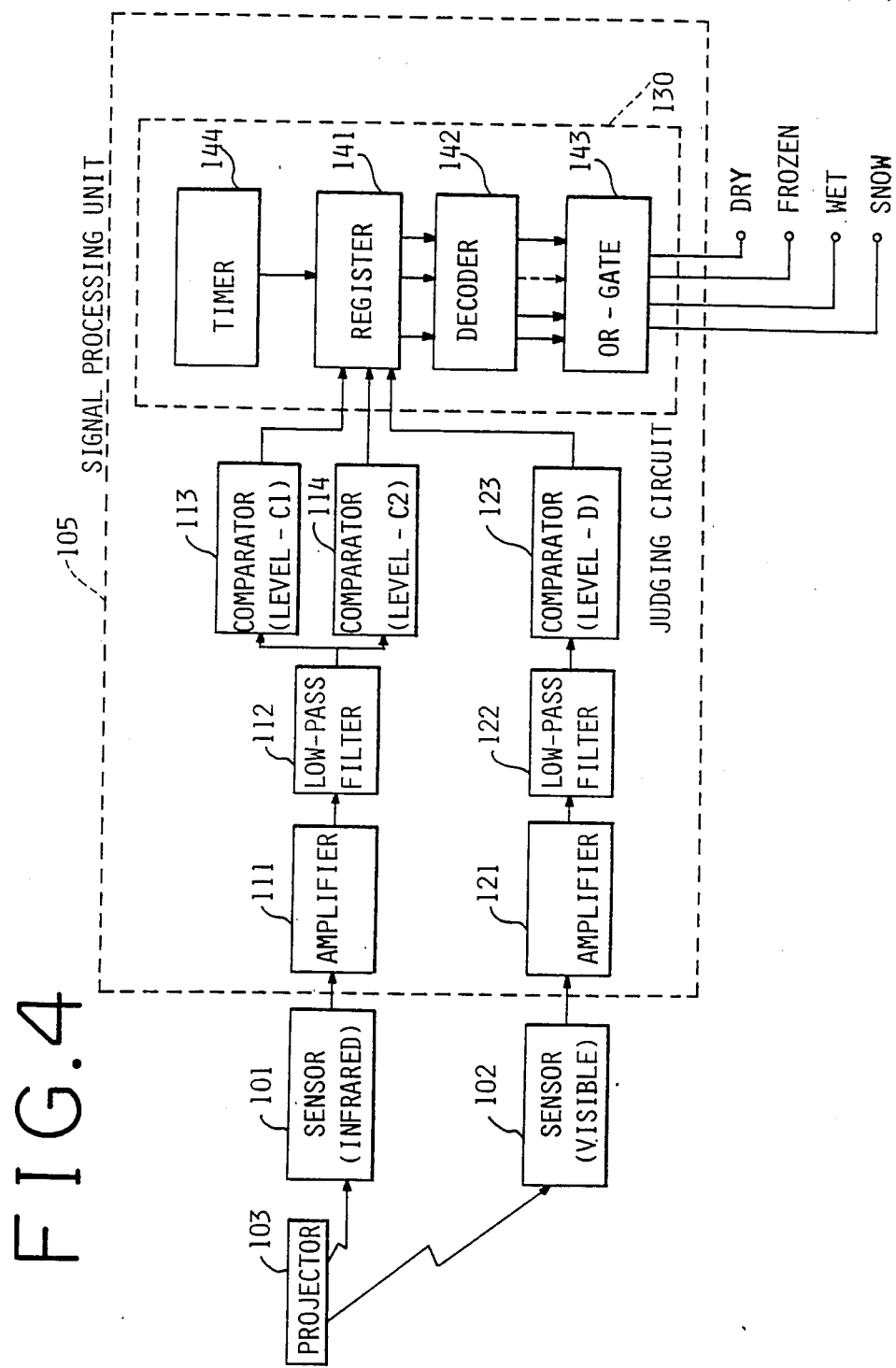
FIG. 4 is a schematic block diagram of a road surface condition detection system as another embodiment of the present invention.

Referring to FIG. 4, there is shown a road surface detection system as another embodiment of the present invention, which isa modification of the system shown in FIG. 2. The detection system of FIG. 4 utilizes light at visible and infrared wavelengths so as to detect frozen road surface without using a thermometer, which comprises a light projector 103, an infrared reflection sensor 101, a visible reflection sensor 102, amplifiers 111 and 121, low pass filters 112 and 122, comparators 113, 114 and 123, and a judging circuit 130. The light projector 103 may be disposed in the position of thermometer 31 of FIG. 1, so as to project light having visible and infrared wavelengths to a detection field of the road surface to be detected by the system. The infrared reflection sensor 101 and visible reflection sensor 102 may be disposed around the position of the light projector 1 or sensor 21 of FIG. 1 so as to receive infrared and visible rays as scatteringly reflected from the road surface. The projector 101 includes a light emitting element for projecting rays at visible wavelengths and infrared wavelengths (1.4 to 2.5 micrometers), which- .may be a mercury-vapor lamp. The infrared reflection sensor 101 may have the same construction as that of the sensor 11 or 21 of FIG. 1, which senses the scatteringly reflected infrared radiation at wavelengths between 1.4 and 2.5 micrometers. The visible reflection sensor 102 includes a photodiode and a visible light filter so as to sense the scattered reflection visible rays only. The output signals generated from the sensors 101 and 102 are amplified by the amplifiers 111 and 121, filtered by the filters 112 and 122 so as to reduce external noise, and applied to the comparators 113, 114 and 123 as DC signals. If desired, the light from the projector 103 may be modulated by a suitable frequency and the modulated signals from the sensors 101 and 102 may be demodulated in the amplifiers 111 and 121 as designed for the system of FIG. 2.

Referring to FIG. 3, the reflectance of freeze at wavelengths longer than 1.4 micrometers is higher than that of snow (or water) and lower than that of dry surface (concrete or asphalt). These reflectance curves have the same tendency even if the reflection angles for sensors 101 and 102 are changed.

In TABLE 4, there are shown the logical output signal data generated from the comparators 113, 114 and 123 based on the experimental data of the system of FIG. 4 regarding four road surface conditions, via, dry, frozen, snow, and wet.

TABLE 4

| INFRARED REFLECTION SIGNAL (OUTPUT OF FILTER 112) | | | | VISIBLE REFLECTION SIGNAL (OUTPUT OF FILTER 122) | | |
|---|---|---|---|---|---|---|
| SURFACE CONDITION | SIGNAL LEVEL | OUTPUT OF COMPARATOR 113 | OUTPUT OF COMPARATOR 114 | SURFACE CONDITION | SIGNAL LEVEL | OUTPUT OF COMPARATOR 123 |
| DRY ∨ | 550 | 1 (>C1) | 0 (≧C2) | WHITE SNOW DRY ∨ wet | 750 2.0 80 | 1 (>D) |
| | | LEVEL C2 | | | LEVEL D | |
| FROZEN ∨ | 330 | 1 (>C1) LEVEL C1 | 1 (<C2) | | | 0 (≦D) |
| SNOW or WET | 80 | 0 (≦C1) | 1 (<C2) | | | |

LEVEL: C1 = 200 mv, C2 = 400 mV, D = 150 mV

The above-listed output signal levels of filters 112 and 122 are the average levels of output signals from said filters as measured over the spactral range of infrared reflection light from 1.4 to 2.5 micrometers. The commparator 113 has a reference signal level LEVEL C1 so that when the surface condition is dry or frozen, the comparator 113 generates the logic signal "1". The comparator 114 has a reference signal level LEVEL C2 so that when the surface condition is frozen, snow or wet, the comparator 114 generates the logic signal "1". The comparator 123 also has a reference signal level LEVEL D so that when the surface condition is snow or dry, the comparator 123 generates the logic signal "1". Thus, by comparing the output signal from filter 112, and that from filter 122, with reference signal levels, LEVEL's C1 and C2 and LEVEL D, respectively, the respective comparators 113, 114 and 123 generate logic signals "1" or "0" corresponding to the respective road surface conditions as shown in TABLE 4.

In TABLE 4, the infrared reflectance of snow or water is relatively low because the infrared radiation is absorbed by water components. The SNOW in the INFRARED REFLECTION SIGNAL column of TABLE 4 includes the snow-jam and black-snow conditions. The frozen road surface has the reflectance which is higher than that of snow or wet condition because the infrared radiation is not absorbed by ice. In the dry road surface condition, the filter 112 generates the highest output signal level because such dry surface has a diffused surface. In the white snow surface condition, the filter 112 generates the highest level output signal because the reflectance at visible wavelengths is nearly 100 per cent. The White Snow in the VISIBLE REFELCTION SIGNAL column of TABLE 4 does not include snow-jam or black-snow condition. The output signal from the filter 122 has the low level in the wet surface condition because the wet surface has a mirror surface and the scattered reflection is reduced though the regular reflection is increased. In the dry surface condition, the road has a diffused surface with a low reflectance which is similar to that snow-jam or black-snow at the visible wavelengths.

It will be understood from TABLE 4 that if the combination data of the output signals for the comparators 113 and 114, (viz. output signal of the comparator 113, output signal of the comparator 114), are (1,0), the combination data show dry surface condition. If the combination is (1,1), it shows frozen surface condition. The combination of (0,1) shows snow or wet condition.

The judging circuit 130 generates an output signal representing the road surface condition of snow, freeze, wetness or dryness based on the results of comparison in the comparators 113, 114 and 123. Namely, the circuit 130 judges the road surface condition based on the output signals from comparators 113 and 114 which are relating to the infrared radiation. Further the circuit 130 judges the road surface condtion based on the output signals from comparator 123 which are relating to the visible radiation. And then the judging circuit finally judges the road surface condition based on the two judgements relating to infrared radiation and visible radiation as shown in TABLE 5.

TABLE 5

| FINAL JUDGEMENT | JUDGEMENT BASED ON INFRARED REFLECTION | JUDGEMENT BASED ON VISIBLE REFLECTION |
|---|---|---|
| DRY | DRY | SNOW or DRY |
| ERROR | DRY | WET |
| FROZEN | FROZEN | SNOW or DRY |
| ERROR | FROZEN | WET |
| WET | WET or SNOW | WET |
| SNOW | WET or SNOW | DRY or SNOW |

In other words, the judging circuit 130 has a predetermined pattern of signals as shown in TABLE 5, and judges respective road surface conditions based on the output signals from the comparators 113, 114 and 123. It should be understood that the combination in TABLE 5 is merely illustrative and that any other suitable judgement schema may be devised by those skilled in the art.

The judging circuit 130 consists of register 141, decoder 142, OR-gate 143 and timer 144, but has functions similar to the functions of the judging circuit 40 of FIG. 2. The judging circuit 130 may be a microprocessor or may be modified into another like circuit as desired.

The detection system in the present embodiment utilizes infrared radiation having the region of the spectrum at the wavelengths from 1.4 to 2.5 micrometers, but may utilize monochromatic light at 1.5 or 2.5 micrometers, in which case a better distinction is obtained between the reflectances of wetness and freeze and, therefore, a more accurate differentiation of the wet from the frozen road surface condition is assured.

The sensors 101 and 102 are adapted to receive scattered light, but if desired, one or both of the sensors may be disposed in the positions where they may receive the regular reflection light, although the combination in sensor 11 of FIG. 1. Moreover, the thermometer 204 and a signal processing unit 250 may be disposed in the same positions as those of the thermometer 30 and unit 5 of FIG. 1, respectively.

The output signals from the sensors 201 to 203 and from the thermometer 204 are applied to amplifiers 205 to 207 and 208, respectively. As shown in FIG. 5, the output signals from these amplifiers are applied to comparators 209 to 213, respectively. The comparators 209 to 213 have reference signal levels, LEVEL 1 to LEVEL 5, respectively, which are predetermined on the basis of the statistically selected data corresponding to the road surface conditions of dryness, snow, wetness and freeze. The relation of the magnitudes of the respective output signals from the amplifiers 205 to 208 with the levels LEVEL 1 to 5 is shown below in TABLE 6.

TABLE 6

| CONDITION OUTPUT | DRY | WET | SNOW | FROZEN | COMPARISON |
|---|---|---|---|---|---|
| AMPLIFIER 205 (Scattered-Infrared) | ↕ | ↕ | ↑ | ↕ | DRY, SNOW<br>LEVEL 1 (COMPARATOR 209)<br>WET, SNOW, FROZEN |
| AMPLIFIER 206 (Scattered-Visible) | ↕ | ↕ | ↑↓ | ↕ | SNOW<br>LEVEL 2 (COMPARATOR 210)<br>SNOW, DRY<br>LEVEL 3 (COMPARATOR 211)<br>WET, FROZEN, DRY |
| AMPLIFIER 207 (Regular-Visible) | ↕ | ↕ | ↑ | ↕ | WET, SNOW<br>LEVEL 4 (COMPARATOR 212)<br>DRY, WET, SNOW, FROZEN |
| AMPLIFIER 208 (Temperature) | ↕ | ↕ | ↑ | ↕ | DRY, WET, SNOW<br>LEVEL 5 (COMPARATOR 213)<br>DRY, WET, SNOW, FROZEN |

TABLE's 4 and 5 must be modified to acertain extent.

Referring to FIG. 5, there is shown a road surface detection system which is still another embodiment of the present invention. The system has sensors that comprise a scattered-infrared light sensor 201 for receiving scattered infrared radiation as reflected from a road surface, a scattered-visible light sensor 202 for receiving scattered visible radiation as reflected from the road surface, a regular-visible light sensor 203 for receiving regular reflection visible radiation from the road surface, and a radiation-type thermometer 204 for sensing the temperature of the road surface. A light projector 200 projects infrared radiation at wavelengths from 1.4 to 2.5 micrometers which is received by the sensor 201, and projects visible radiation at wavelengths from 0.5 to 1.09 micrometers which is received by the sensors 202 and 203. The projector 200 may be disposed in the same position as that of the projector 1 shown in FIG. 1, the sensors 201 and 202 may be disposed in the same position as that of the sensor 21 of FIG. 1, and the sensor 203 may be disposed in the same position as that of the If the magnitude of the output signal from amplifier is higher than the level LEVEL 1, the comparator 209 generates a logic signal "1" which suggests that the surface condition is dry or snow, whereas if not higher, the comparator generates a logic signal "0" suggesting that the surface condition is wet, snow or frozen. If the magnitude of the output signal from amplifier 206 is higher than LEVEL 2, the comparator 210 generates a logic signal "1" suggesting that the surface condition is snow, whereas if not higher, the comparator generates a logic signal "0" suggesting that the condition is dry, wet, snow or frozen. If the magnitude of the output signal from amplifier 206 is higher than LEVEL 3, the comparator 211 generates a logic signal "1" suggesting that the condition is snow or dry, whereas if lower than LEVEL 3, the comparator 211 generates a logic signal "0" suggesting that the surface condition is dry, wet or frozen. If the magnitude of the output signal from the amplifier 207 is higher than LEVEL 4, the comparator 212 generates a logic signal "1" suggesting that the condition is wet or snow, whereas if not higher, the comparator generates a signal "0" suggesting that the condition is dry, wet, snow or frozen. If the magnitude of the output signal from the amplifier 208 is higher than LEVEL 5, the comparator 213 generates a logic signal "1" suggesting that the condition is dry, wet or snow, whereas if not higher, the comparator 213 generates a logic signal "0" suggesting that the condition is dry, wet, snow, or frozen. The levels LEVEL 1 to 5 may be corrected by a correction circuit (not shown in drawings) in correspondence with the intensity of projected light form the projector 200, if desired.

Figure 6:
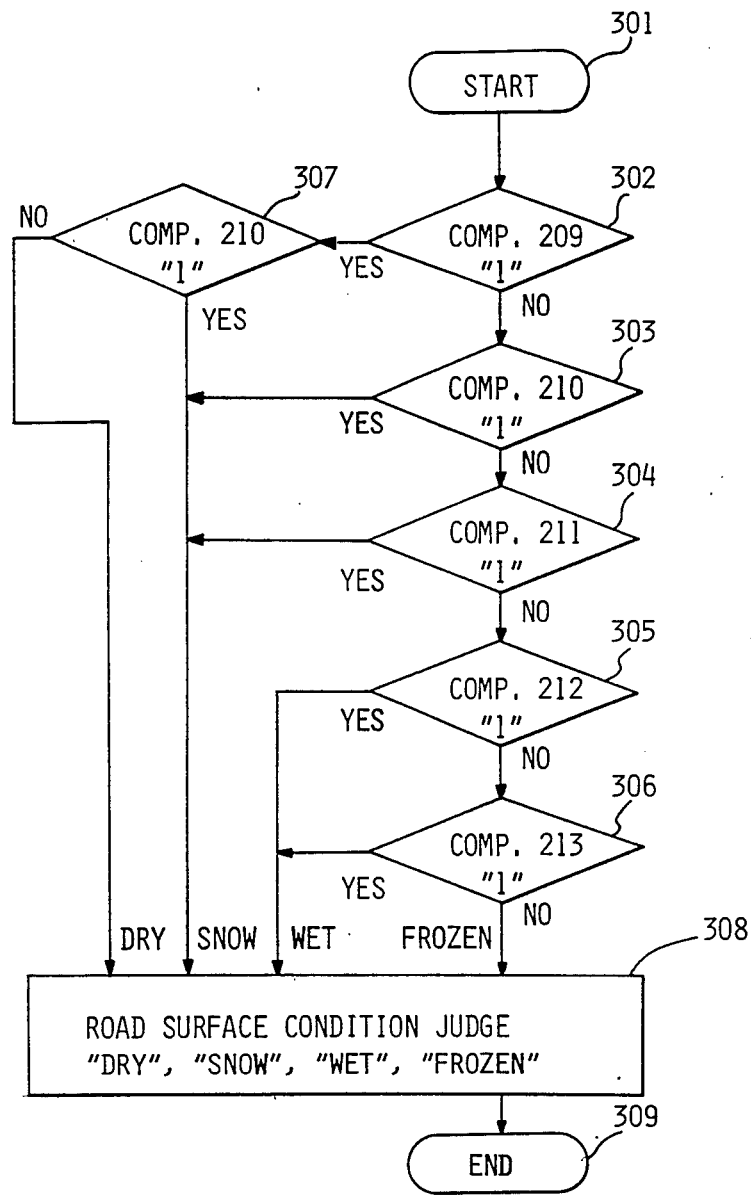
FIG. 6 is a flow chart illustrating the operation of the detection system of FIG. 5.

Such results of comparison in the comparators 209 to 213 are applied to a logic circuit 214 which judges the road surface condition in accordance with a flow chart shown in FIG. 6. In step 302, the circuit 214 inquires if the logic signal generated from the comparator 209 is "1". A YES response is applied to step 307 in which it is inquired if the logic signal generated from the comparator 210 is "1". A YES response at the step 307 representes that the surface condition is snow, and is applied to a step 308. A NO response at the step 307 representes that the surface condition is dry, and is applied to the step 308. The YES response at the step 302 represents that the condition is dry or snow as described above, where the snow means white snow.

A NO response at step 302 suggesting one of the wet, snow and frozen conditions is applied to a step 303 in which it is inquired if the logic signal from the comparator 210 is "1". A YES response at the step 303 means snow condition, and is applied to the step 308. A NO response from the step 303 suggests one of snow, wet and frozen conditions because it is regarded that the dry condition has been detected in the steps 302 and 307, and is applied to step 304. Therefore, a YES response at step 304 represents that the surface condition is snow, and is applied to the step 308. If the logic signal generated from the comparator 211 is "0", a NO response is made in the step 304 and is applied to step 305. The NO response from the step 304 means the possibility that the surface condition is wet or frozen because the dry condition has been detected in the steps 302 and 307. In a step 305 it is inquired whether the surface condition is wet or frozen. Since the logic signal "1" from the comparator 212 suggests that the condition is wet or snow, a YES response from the step 305 represents that the condition is wet. A NO response at the step 305, however, still suggests that the condition is wet or frozen, and is applied to a step 306. A YES response from the step 306 indicates that the surface condition is wet but not frozen, and is applied to the step 308. On the other hand, a NO response from the step 306 represents that the condition is frozen, and is applied to the step 308. The frozen condition detected in the step 306 includes the condition that the surface of the frozen road is wet.

In the step 308, the respective four comparison results from the steps 302 to 307 are sequentially judged in order of dryness, snow, wetness and freeze, and the circuit 214 finally makes a final judgement that the road surface sensed by the sensors is some particular one of the four surface conditions.

The comparator 213 has only one reference signal level LEVEL 5, but may be modified to have two reference signal levels corresponding to the temperatures of 0° C. and −2° C. Moreover, the flow chart may be modified so as to detect wet condition, wet and frozen condition or frozen condition.

In the present embodiment, the respective road surface conditions are detected by the respective sensors so that the detection of the respective surface conditions can be precisely performed. The dry condition is detected by the sensor 201 based on the scattered infrared reflection light. The snow condition is detected by the sensor 202 based on the scattered visible reflection light. The wet condition is detected by the sensor 203 based on the regular reflection visible light. The frozen condition is detected by the sensor, viz. thermometer 204, based on the road surface temperature. Thus, the surface condition detection system in the present embodiment may perform precise and fast detection.

It will be understood from the above description of embodiments that the road surface condition detection system basically employs infrared radiation for respective surface condition detections by utilizing the fact that the respective road surfaces have the respectively different reflectances of infrared radiation, and performs an excellent detection of a road surface condition.

Though in the above embodiments the shortest wavelength of the infrared radiation employed in the detection systems is described as 1.4 micrometers which is based on experimental data under a certain circumstance, the shortest wavelength may be modified in accordance with respective circumstances as long as the reflectance of snow is smaller than that of the dry surface at the wavelengths longer than the shortest wavelength.

The detection systems in the above embodiments may further be modified such that the system will judge the surface condition to be wetness within a predetermined time period, e.g. 6 hours, after thawing agent has been spread over the road surface in spite of the surface condition being actually frozen condition.

It should be understood that the above description is merely illustrative of the present invention and that many changes and modifications may be made by those skilled in the art without departing from the scope of the appended claims.

What is claimed is:

1. Road surface condition detection system comprising:
    light projecting means for projecting light including infrared light to a road surface to sense the condition thereof;
    said infrared light having a wavelength or wavelengths at which the reflectance of snow is smaller than that of asid road surface in a dry condition,
    light receiving means for receiving light reflected from said road surface and for generating output signals representing the luminous energy of said reflected light;
    comparison means for comparing said output signals with predetermined reference signals levels corresponding to classified road surface conditions so as to generate comparison output signals representing results of comparison; and
    judging means for judging said road surface to be one of said classified road surface conditions in accordance with said comparison output signals.

2. Road surface condition detection system according to claim 1, wherein said judging means stores a predetermined pattern of signals for determination of road surface conditiosn and judges the condition of said road surface by comparing said comparison output signals with said predetermined pattern of signals.

3. Road surface condition detection system according to claim 1, wherein said light receiving means includes a sensor for receiving regularly reflected light from said road surface and a sensor for receiving scattered light as reflected from the road surface.

4. Road surface condition detection system according to claim 1 which further comprises temperature sensing means for sensing the temperature of said road surface to generate a temperature output signal representing the sensed temperature, and wherein said comparison means compares said temperature output signal with a predetermined reference temperature signal level so as to generate a comparison output signal representing the result of the comparison.

5. Road surface condition detection system according to claim 1, wherein said light projected from said light projecting means further includes visible radiation and said light receiving means includes a visible radiation sensor for receiving scattered visible radiation as reflected from said road surface and an infrared radiation sensor for receiving scattered infrared radiation as reflected from the road surface.

6. Road surface condition detection system according to claim 5 which further comprises temperature sensing means for sensing the temperature of said road surface to generate a temperature output signal representing the sensed temperature and wherein said comparison means further compares said temperature output signal with a predetermined reference temperature signal level so as to generate a comparison output signal representing the comparison result.

7. Road surface condition detection system according to claim 6, wherein said light receiving means further comprises a regular visible radiation sensor for receiving regular reflection visible radiation from said road surface.

8. Road surface condition detection system according to claim 7, wherein said judging means determines dryness in response to the output signal from said infrared sensor, snow in response to the output signal from said visible radiation sensor, wetness in response to the output signal from said regular visible radiation sensor and freeze in response to the output signal from said temperature sensing means.

9. Road surface condition detection system according to claim 1, wherein the wavelength of said infrared light is 1.4 to 2.5 micrometers.

10. Road surface condition detection system according to claim 1, wherein said infrared region has a wavelength at which the reflectance of snow is smaller than that of ice.

11. Road surface condition detection system according to claim 1, wherein said judging means further includes a timer for presetting a predetermined time period and upon detection of a constancy of said comparison output signal within said predetermined time period is operative to judge the road surface condition.

* * * * *